US012706851B2

(12) United States Patent
Psenak et al.

(10) Patent No.: US 12,706,851 B2
(45) **Date of Patent: *Aug. 11, 2026**

(54) SYSTEMS AND METHODS FOR LINK STATE FLOODING TRANSMITTER-BASED FLOW CONTROL

(71) Applicant: Cisco Technology, Inc., San Jose, CA (US)

(72) Inventors: Peter Psenak, Bratislava (SK); Marek Karasek, Ceska (CZ); Lester C. Ginsberg, Mount Hermon, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/774,138

(22) Filed: Jul. 16, 2024

(65) Prior Publication Data

US 2024/0372816 A1 Nov. 7, 2024

Related U.S. Application Data

(63) Continuation of application No. 17/493,498, filed on Oct. 4, 2021, now Pat. No. 12,068,969.

(51) Int. Cl.
*H04L 47/25* (2022.01)
*H04L 47/26* (2022.01)

(52) U.S. Cl.
CPC .............. *H04L 47/25* (2013.01); *H04L 47/26* (2013.01)

(58) Field of Classification Search
None
See application file for complete search history.

(56) References Cited

U.S. PATENT DOCUMENTS 6,577,599 B1 6/2003 Gupta et al.
6,850,488 B1 * 2/2005 Wesley ................. H04L 47/263 370/252

(Continued)

FOREIGN PATENT DOCUMENTS

EP 1656814 B1 1/2010
EP 2421206 A1 2/2012

OTHER PUBLICATIONS

Ash J., et al., "Congestion Avoidance Control for OSPS Networks," Network Working Group, Internet Draft, Congestion Avoidance and Control for OSPF Networks, draft-ash-manral-ospf-congestion-control-00.txt , Apr. 2002, 18 Pages.

(Continued)

*Primary Examiner* — Jamaal Henson
(74) *Attorney, Agent, or Firm* — Baker Botts L.L.P.

(57) ABSTRACT

In one embodiment, a method for link state flooding between a network node and a receiving node includes determining a current transmit rate that Link State Protocol Data Units (LSPs) are being transmitted from the network node to the receiving node. The method further includes determining an LSP acknowledgment rate that indicates a rate at which a plurality of LSP acknowledgments are received at the network node from the receiving node. The method further includes determining a new transmit rate based on the current transmit rate and the LSP acknowledgment rate. The method further includes transmitting a plurality of LSPs from the network node to the receiving node using the new transmit rate.

17 Claims, 3 Drawing Sheets

(56) References Cited

U.S. PATENT DOCUMENTS 7,742,431 B2 6/2010 Ng et al.
10,382,323 B1 8/2019 Dave et al.
10,986,027 B1 4/2021 Sears et al.
2002/0181637 A1* 12/2002 Nakabayashi ........ H04L 1/0034 375/372
2004/0158754 A1* 8/2004 Walls .................. H04L 47/6255 713/323
2004/0174825 A1 9/2004 Li et al.
2006/0026296 A1* 2/2006 Nagaraj .................. H04L 47/25 709/233
2006/0067238 A1* 3/2006 Olsson .................... H04L 1/187 370/242
2006/0187885 A1* 8/2006 Roy ........................ H04L 1/203 370/332
2007/0049239 A1 3/2007 Joung et al.
2008/0095058 A1 4/2008 Dalmases et al.
2010/0284424 A1 11/2010 Eitan
2011/0134756 A1* 6/2011 Park ...................... H04W 40/02 370/238
2012/0044940 A1 2/2012 Katz et al.
2013/0070637 A1 3/2013 Lindem, III et al.
2013/0121211 A1* 5/2013 Ward ...................... H04L 45/03 370/255
2014/0043956 A1 2/2014 Mirtorabi et al.
2016/0294505 A1 10/2016 Turner et al.
2019/0058666 A1* 2/2019 Pudlewski .............. H04L 47/28
2020/0036644 A1 1/2020 Belogolovy et al.
2024/0195740 A1* 6/2024 Pan ....................... H04L 47/267

OTHER PUBLICATIONS

Decraene B., et al., "IS-IS Flooding Parameters Advertisement," Network Working Group, Oct. 29, 2020, 14 pages, Retrieved from URL: https:/www.ietf.org/archieve/id/draft-decraene-Isr-isis-fooding-speed.05.txt.

International Search Report and Written Opinion for International Application No. PCT/US2022/076897, mailed Dec. 19, 2022, 14 Pages.

Office Action—Notice of Intention to Grant for European Application No. 22789442.5, dated Sep. 3, 2025, 29 Pages.

* cited by examiner

SYSTEMS AND METHODS FOR LINK STATE FLOODING TRANSMITTER-BASED FLOW CONTROL

PRIORITY

This nonprovisional application is a continuation under 35 U.S.C. § 120 of U.S. patent application Ser. No. 17/493,498 filed on Oct. 4, 2021, and entitled "Systems and Methods for Link State Flooding Transmitter-Based Flow Control," which is hereby incorporated by reference in its entirety.

TECHNICAL FIELD

This disclosure generally relates to link state routing, and more specifically to systems and methods for link state flooding transmitter-based flow control.

BACKGROUND

Link state routing protocols are widely used in various network applications. Some examples of link state routing protocols are Open Shortest Path First (OSPF) and Intermediate System-to-Intermediate System (IS-IS). In these protocols, when a network topology change occurs, Link State Protocol Data Units (LSPs) are generated and flooded into neighboring nodes of the network. As the number of nodes in a network increases, however, link state flooding requires an increasing amount of time, computer, and network resources to complete.

DESCRIPTION OF EXAMPLE EMBODIMENTS

Overview

Figure 1:
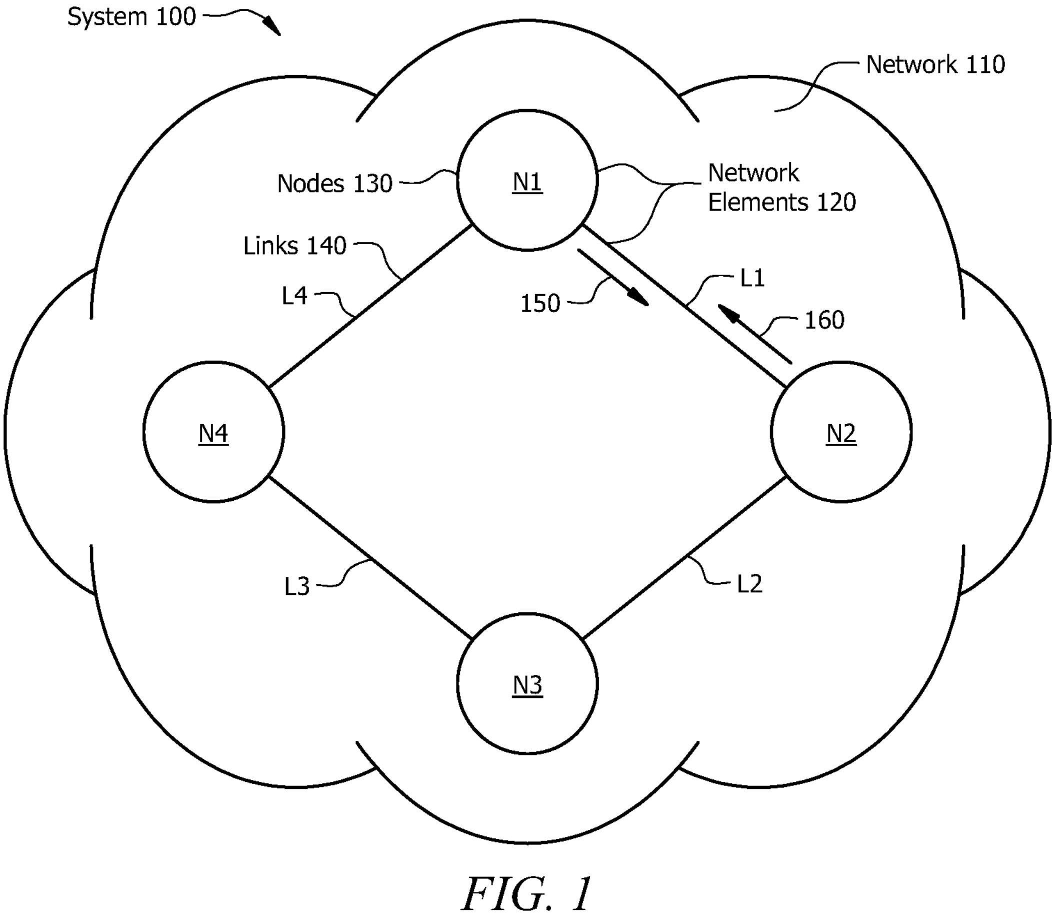
FIG. 1 illustrates a system that utilizes link state flooding transmitter-based flow control, in accordance with certain embodiments.

According to an embodiment, an apparatus includes one or more processors and one or more computer-readable non-transitory storage media coupled to the one or more processors. The one or more computer-readable non-transitory storage media include instructions that, when executed by the one or more processors, cause the apparatus to perform link state flooding operations to a receiving node, the link state flooding operations including determining a current transmit rate that Link State Protocol Data Units (LSPs) are being transmitted from the network node to the receiving node. The operations further include determining an LSP acknowledgment rate that indicates a rate at which a plurality of LSP acknowledgments are received at the transmitting network node from the receiving node. The operations further include determining a new transmit rate based on the current transmit rate and the LSP acknowledgment rate. The operations further include transmitting a plurality of LSPs from the network node to the receiving node using the new transmit rate.

According to another embodiment, a method for link state flooding between a network node and a receiving node includes determining a current transmit rate that LSPs are being transmitted from the network node to the receiving node. The method further includes determining an LSP acknowledgment rate that indicates a rate at which a plurality of LSP acknowledgments are received at the network node from the receiving node. The method further includes determining a new transmit rate based on the current transmit rate and the LSP acknowledgment rate. The method further includes transmitting a plurality of LSPs from the network node to the receiving node using the new transmit rate.

According to yet another embodiment, one or more computer-readable non-transitory storage media embody instructions that, when executed by a processor, cause the processor to perform link state flooding operations, the link state flooding operations including determining a current transmit rate that LSPs are being transmitted from the network node to the receiving node. The operations further include determining an LSP acknowledgment rate that indicates a rate at which a plurality of LSP acknowledgments are received at the network node from the receiving node. The operations further include determining a new transmit rate based on the current transmit rate and the LSP acknowledgment rate. The operations further include transmitting a plurality of LSPs from the network node to the receiving node using the new transmit rate.

Technical advantages of certain embodiments of this disclosure may include one or more of the following. Certain systems and methods described herein use an adaptive algorithm based on a state known to a transmitter to perform link state flooding to a neighboring node. LSPs are flooded to a neighboring node at a rate that is based on information already maintained by the transmitting node (e.g., an LSP retransmission queue). By maximizing an LSP transmission rate to a rate that a receiver can support, the time required to flood LSPs to nodes in a network is reduced. Furthermore, by not requiring specialize rate signaling from a receiving node in order to adjust an LSP transmission rate, network and computer resources may be optimized. Other technical advantages will be readily apparent to one skilled in the art from the following figures, descriptions, and claims. Moreover, while specific advantages have been enumerated above, various embodiments may include all, some, or none of the enumerated advantages.

Example Embodiments

Link state routing protocols are widely used in various network applications. Some examples of link state routing protocols are Open Shortest Path First (OSPF) and Intermediate System-to-Intermediate System (IS-IS). In these protocols, when a network topology change occurs, a Link State Update process is performed where Link State Protocol Data Units (LSPs) are generated and flooded into neighboring nodes of the network. Currently, link state routing protocols such as IS-IS limit link state flooding on a given interface to tens of LSPs per second (e.g., 33 LSPs/second). For networks with thousands of nodes, the failure of a node with hundreds of neighbors can result in hundreds of new LSPs being generated. At typical flooding rates, this scenario would require tens of seconds simply to flood all of the changed LSPs to a given neighbor—an unacceptable amount of time for most applications. While blindly increasing flooding rates is possible, this solution introduces the risk of overwhelming a receiver.

To address these and other issues with link state flooding within link state routing protocols, embodiments of the disclosure provide an adaptive algorithm based on a state known to a transmitter to perform link state flooding to a neighboring node. Traditional flow control techniques rely on direct rate signaling (i.e., signaling to increase or decrease a transmit rate) from the receiver—but these solutions are difficult to achieve when the data stream consists of a series of individual Protocol Data Units (PDUs). Embodiments of the disclosure, however, utilize an adaptive link state flooding algorithm that is based on a state known to the transmitter (i.e., without direct rate signaling from the receiver to increase or decrease a transmit rate). As a result, link state flooding to a neighboring node can be optimized and the time required to complete the Link State Update process may be reduced. This results in an optimized use of network and computing resources.

Figure 2:
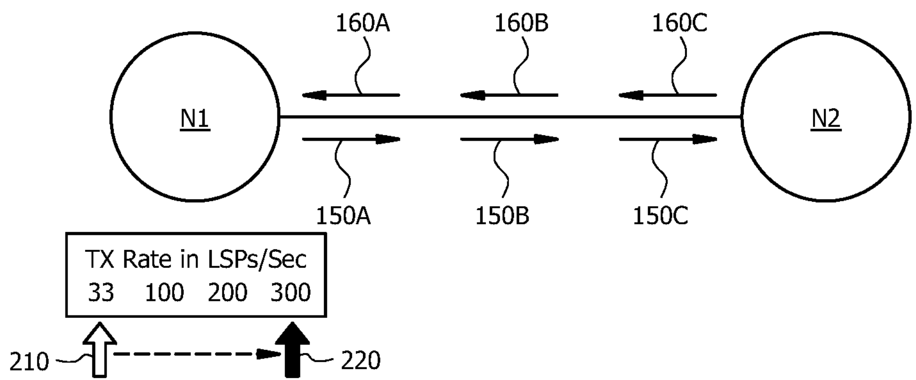
FIG. 2 illustrates an increase in an LSP transmit rate by a system that utilizes link state flooding transmitter-based flow control, in accordance with certain embodiments.
Figure 3:
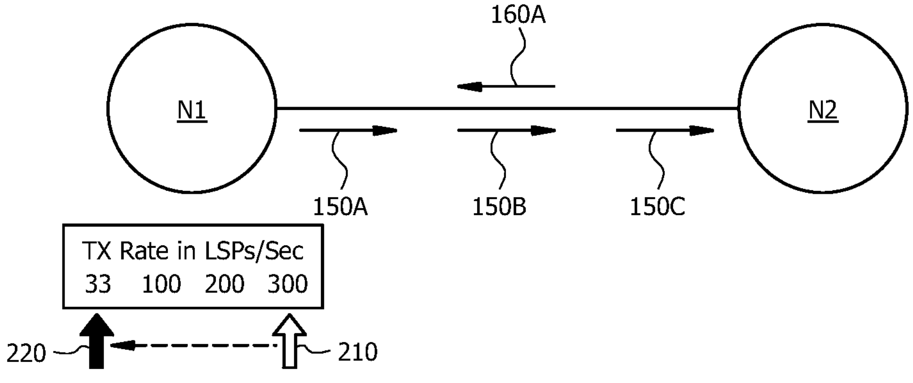
FIG. 3 illustrates a decrease in an LSP transmit rate by a system that utilizes link state flooding transmitter-based flow control, in accordance with certain embodiments.
Figure 4:
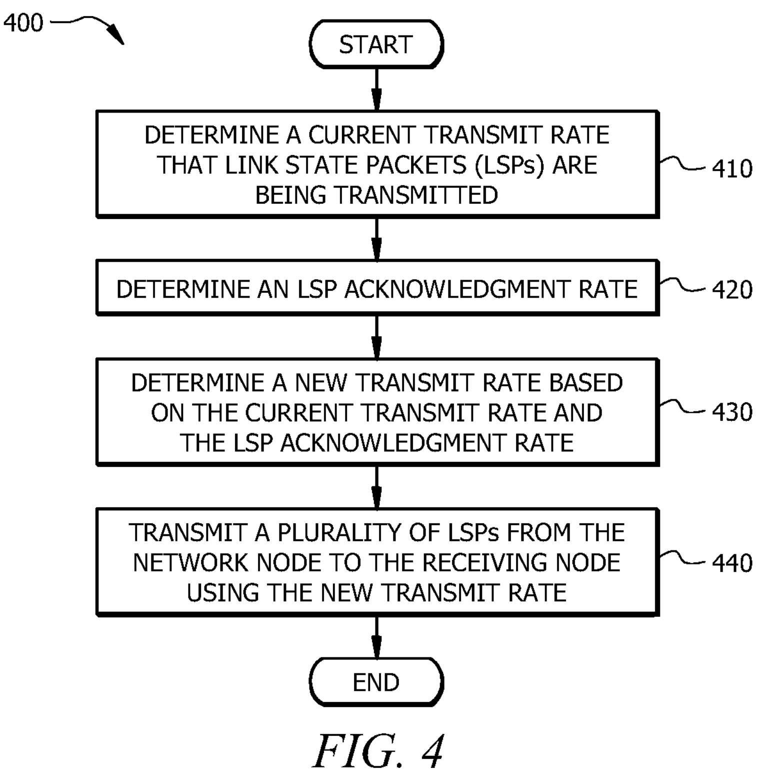
FIG. 4 illustrates a method for link state flooding transmitter-based flow control, in accordance with certain embodiments.
Figure 5:
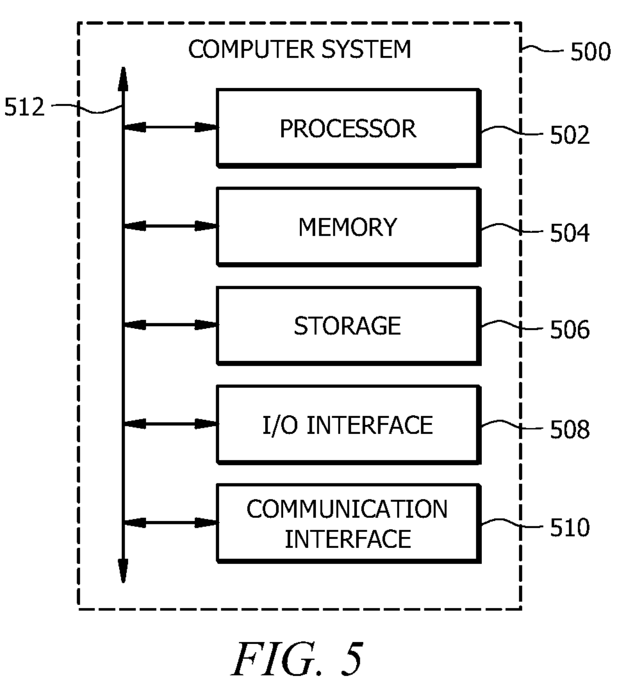
FIG. 5 illustrates a computer system, in accordance with certain embodiments.

FIG. 1 shows an example system that provides link state flooding transmitter-based flow control. FIG. 2 shows an increase in an LSP transmit rate by the system of FIG. 1, and FIG. 3 shows a decrease in an LSP transmit rate by the system of FIG. 1. FIG. 4 shows an example method for link state flooding transmitter-based flow control. FIG. 5 shows an example computer system that may be used by the systems and methods of FIGS. 1 through 4.

FIG. 1 illustrates an example system 100 that provides link state flooding transmitter-based flow control. System 100 includes a network 110 and network elements 120. The components of system 100 may include any suitable combination of hardware, firmware, and software. For example, the components of system 100 may use one or more components of the computer system of FIG. 5.

In general, nodes 130 of system perform link state flooding transmitter-based flow control when transmitting LSPs 150 to a neighboring node 130. To do so, a transmitting node 130 determines a current transmit rate that LSPs 150 are being transmitted to the receiving node 130. The transmitting node also determines an LSP acknowledgment rate that indicates a rate at which LSP acknowledgments 160 are received from the receiving node 130. The transmitting node 130 then determines a new transmit rate based on the current transmit rate and the LSP acknowledgment rate and then transmits LSPs 150 to the receiving node 130 using the new transmit rate. As a result, the transmitting node 130 optimizes and maximizes the rate at which LSPs 150 are flooded to neighboring nodes 130 during a Link State Update process.

Network 110 of system 100 is any type of network that facilitates communication between components of system 100. Network 110 may connect one or more components of system 100. This disclosure contemplates any suitable network. For example, one or more portions of network 110 may include an ad-hoc network, an intranet, an extranet, a VPN, a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like. In some embodiments, network 120 is any network that utilizes a link state routing protocol such as OSPF or IS-IS.

Network elements 120 of system 100 are hardware, software, and protocols associated with network 110. Network elements 120 constitute the infrastructure of network 110. Network elements 120 include nodes 130. Nodes 130 receive, create, store and/or send data along a path of network 110. Nodes 130 may include one or more endpoints and/or one or more redistribution points that recognize, process, and forward data to other nodes 130. Nodes 130 may include virtual and/or physical network nodes. In certain embodiments, one or more nodes 130 include data communications equipment such as switches, bridges, modems, hubs, and the like. In some embodiments, one or more nodes 130 include data terminal equipment such as routers, servers, printers, workstations, and the like. Nodes 130 of system 100 include nodes N1, N2, N3, and N4.

Network elements 120 of system 100 also include links 140. Links 140 are physical and logical network components used to interconnect nodes 130. Links 140 of system 100 include links L1, L2, L3, and L4. Link L1 connects nodes N1 and N2, link L2 connects nodes N2 and N3, link L3 connects nodes N3 and N4, and link L4 connects nodes N4 and N1.

During a Link State Update process, a particular node 130 sends (i.e., "floods") LSPs 150 to a neighboring node 130 in order to provide updated network information to the neighboring node 130. For example, node N1 may send multiple LSPs 150 to node N2 in order to provide updated network information to node N2. In response, node N2 sends an LSP acknowledgement 160 back to node N1 for each received LSP 150. As described in more detail below, the rate at which LSPs 150 are flooded from node N1 to node N2 may be adjusted (i.e., increased or decreased) based on a rate at which LSP acknowledgements 160 are received at node N1. As a result, node N1 may utilize a maximized rate for flooding LSPs 150 to node N2, thereby decreasing the amount of time required to complete the Link State Update process.

In operation, system 100 provides link state flooding transmitter-based flow control that allows nodes 130 to maximize the rate at which LSPs 150 are flooded to neighboring nodes 130. Particular examples of the operation of system 100 will now be described in reference to FIGS. 2 and 3. In FIG. 2, node N1 transmits LSPs 150 (e.g., LSPs 150A-C) to node N2 at a current transmit rate 210 (e.g., 33 LSPs/second). Once node N2 receives and is able to process the received LSP 150, node N2 sends an LSP acknowledgement 160 back to node N1 for every LSP 150 received and processed from node N1 (e.g., LSP acknowledgements 160A-C). In this particular example, node N2 sends an LSP acknowledgement 160 for each received LSP 150 back to node N1 within a certain amount of time such that node N1 determines that an LSP acknowledgement rate from node N2 is equal to or greater than current transmit rate 210. As a result, node N1 determines that node N1 is able to accommodate the current transmit rate 210 and therefore increases current transmit rate 210 to a new transmit rate 220 of 300 LSPs/second. In FIG. 3, node N1 transmits LSPs 150 (e.g., LSPs 150A-C) to node N2 at a current transmit rate 210 (e.g., 300 LSPs/second). Once node N2 receives and is able to process the received LSP 150, node N2 sends an LSP acknowledgement 160 (e.g., LSP acknowledgement 160A) back to node N1 for every LSP 150 received and processed from node N1. In this particular example, node N2 only sends LSP acknowledgement 160A back to node N1 to acknowledge LSP 150A within a certain amount of time. Because node N2 has not acknowledged LSPs 150B-C within a certain amount of time, node N1 determines that an LSP acknowledgement rate from node N2 is less than current transmit rate 210 of LSPs 150. As a result, node N1 determines that node N1 is not able to accommodate the current transmit rate 210 and therefore decreases current transmit rate 210 to a new transmit rate 220 of 33 LSPs/second. Particular embodiments of adaptive algorithms used to analyze and determine current transmit rate 210, the LSP acknowledgement rate, and new transmit rate 220 are discussed in more detail below.

In some embodiments, a particular node 130 utilizes an adaptive algorithm that attempts to find the highest LSP transmit rate that a receiver node 130 can support. To determine the highest LSP transmit rate, the algorithm monitors an LSP retransmit queue in certain embodiments. In general, each node 130 maintains a locally-stored LSP retransmit queue. When an LSP 150 is sent to a receiving node 130, the LSP 150 is added to the retransmit queue and is then deleted from the retransmit queue once a corresponding LSP acknowledgement 160 is received from the receiving node 130. If LSPs 150 accumulate on the retransmit queue waiting for retransmission (e.g., LSPs 150 stay on the retransmit queue for a predetermined amount of time), the transmitting node 130 determines that current transmit rate 210 (i.e., CurrentLSPTxMax described below) should be decreased. Conversely, if LSPs 150 are acknowledged within a certain amount of time, the transmitting node 130 determines that current transmit rate 210 (i.e., CurrentLSPTxMax described below) should be increased. In some embodiments, increases and decreases to current transmit rate 210 may be further determined by measured rates (e.g., by LSPRxRateAverage described below) so that a transmit rate supported by the receiver node 130 is determined as quickly as possible.

In some embodiments, the adaptive algorithm used by a transmitting node 130 to find the highest LSP transmit rate that a receiver node 130 can support utilizes the following variable listed in TABLE 1:

TABLE 1

| | |
|---|---|
| CurrentLSPTxMax | Current maximum number of LSPs 150 which can be transmitted/second |
| LSPTxRate: | Measured rate at which node is sending LSPs 150 on the interface/second |
| LSPRxRate: | Measured rate at which node is removing LSPs 150 from retransmission queue on the interface/second |
| LSPTxRateHist[Idx] | Array of last X LSPTxRate (e.g., seven) |
| LSPRxRateHist[Idx] | Array of last X LSPRxRate (e.g., seven) |
| LSPTxRateAverage | Average rate which node is sending LSPs 150 on the interface/second |
| LSPRxRateAverage | Average rate at which node is removing LSPs 150 from retransmission queue on the interface/second |
| LSPTxHoldtimeCount | Number of seconds LSPTxHoldtime. During these seconds, UpdateLevel is achieved and CurrentLSPTxMax could be increased but it is not, because LSPTxHoldtime is active |
| LSPTxHoldtimeActive | True if CurrentLSPTxMax increase is frozen |

In some embodiments, the adaptive algorithm used by a transmitting node 130 to find the highest LSP transmit rate that a receiver node 130 can support utilizes the following parameters listed in TABLE 2:

TABLE 2

| | |
|---|---|
| MaxLSPTx | Maximum number of LSPs 150 transmitted/second/interface |
| MinLSPTx | Minimum number of LSPs 150 which may be transmitted/second/interface |
| UpdateBackoff | Percent backoff when congestion occurs (e.g., 1-99) |
| UpdateIncrement | Percent increment when congestion has cleared (e.g., 1-99) |
| UpdateLevel | Level of RX rate which needs to be achieved in order to increase CurrentLSPTxMax (e.g., 1-99) |
| LSPTxHoldtime | Configured number of seconds during which CurrentLSPTxMax is frozen for increase. During these seconds, UpdateLevel is achieved and CurrentLSPTxMax could be increased if LSPTxHoldtime is not active |
| PSNPDelay | Maximum time in which a neighbor is expected to acknowledge LSP 150 (e.g., by LSP acknowledgement 160). If LSP 150 stays on the retransmit list longer than PSNPDelay, it is counted as an unacknowledged LSP |
| UackSafe | Allowed level of unacknowledged LSPs (LSPs 150 which are on the retransmit list longer than PSNPDelay). A safe level may be a very small number (e.g., 1%) to cover some unexpected packet loss |

In some embodiments, the adaptive algorithm utilizes timers (e.g., a one-second timer) to execute tasks periodically and repeatedly in order to find the highest LSP transmit rate that a receiver node 130 can support. For example, some embodiments repeatedly perform the following tasks at the end of every one-second timer:

1.) Examine the retransmit queue (e.g., determine if the LSP retransmit queue contains new LSPs 150 which were expected to be acknowledged already (e.g., older than PSNPDelay)).
2.) Save LSPTxRate and LSPRxRate into array of last X rates.
3.) Compute LSPTxRateAverage, LSPRxRateAverage, TxTotal, and RxTotal.
4.) Compute CurrentLSPTxMax. In some embodiments, CurrentLSPTxMax may be the same as the previous CurrentLSPTxMax, the rate can increase according UpdateIncrement, or the rate can decrease according UpdateBackoff. The rate can be also adapted to the measured capability of receiver: LSPRxRateAverage. One part of the CurrentLSPTxMax computation is Holdtime evaluation. In general, CurrentLSPTxMax is not increased during LSPTxHoldtime period.

Each of the four periodic tasks in the example above will now be described in more detail. For step one (i.e., examining the LSP retransmit queue), the LSP retransmit queue is examined from the oldest entries to the newest entries. Each LSP entry is categorized into one of three categories and counted: 1) old entries (i.e., entries that were previously counted), 2) entries older than PSNPDelay and have not been counted yet, and 3) entries younger than PSNPDelay. For step two, LSPTxRate and LSPRxRate for the previous second are saved into an array of the average rates. For step three, LSPTxRateAverage, LSPRxRateAverage, TxTotal, and RxTotal are computed based on the counts of step one. For step four, CurrentLSPTxMax is computed based on LSPRxRateAverage computed in step three.

In some embodiments, the adaptive algorithm utilizes the LSPTxHoldtime parameter to freeze changes in CurrentLSPTxMax. Without LSPTxHoldtime, the adaptive algorithm may try to increase CurrentLSPTxMax whenever it detects that the receiver node 130 is keeping up with the flooding from the transmitting node 130. This may cause undesirable effects (e.g., rate oscillations) in some situations. To address this, the adaptive algorithm may limit transmissions by utilizing the LSPTxHoldtimeActive period, which starts to run after CurrentLSPTxMax increase/decrease sequence, and during which an attempt to increase CurrentLSPTxMax is not performed. The length of LSPTxHoldtimeActive period is configured by parameter LSPTxHoldtime. In general, an example implementation of LSPTxHoldtime may include the following steps: 1) note if LSP transmit rate was increased, 2) if LSP transmit rate was decreased after increase, set LSPTxHoldtimeActive, 3) prevent an increase in CurrentLSPTxMax during LSPTxHoldtimeActive (instead maintain LSPTxHoldtimeCount), and 4) when LSPTxHoldtimeCount is larger than LSPTxHoldtime, clear LSPTxHoldtimeActive and allow for CurrentLSPTxMax at the next opportunity.

Although system 100 of FIG. 1 describes and illustrates particular network elements 120 performing particular actions, this disclosure contemplates any suitable network element 120 or combination thereof performing any suitable action. For example, node N3 may perform one or more actions described above for system 100. As another example, a network controller may perform one or more actions described above for system 100.

Although FIG. 1 illustrates a particular number of networks 110 and network elements 120, this disclosure contemplates any suitable number of networks 110 and network elements 120. For example, network 110 may include more or less than four nodes 130 and/or four links 140. Although FIG. 1 illustrates a particular arrangement of network 110 and network elements 120, this disclosure contemplates any suitable arrangement of network 110 and network elements 120.

FIG. 4 illustrates an example method 400 for link state flooding transmitter-based flow control. Method 400 may be performed by any node 130 within network 110 to flood LSPs to a neighboring node 130 at a maximized transmit rate that the neighboring node can support. In some embodiments, method 400 is performed using a link state protocol such as IS-IS or OSPF. One or more steps of method 400 may be performed using the adaptive algorithm described above.

Method 400 begins at step 410. At step 410, method 400 determines a current transmit rate that LSPs are being transmitted from a network node to a receiving node. In some embodiments, the LSPs are LSPs 150, and the current transmit rate is current transmit rate 210. In some embodiments, step 410 includes analyzing a retransmit queue of LSPs on the network node to determine how fast LSPs are being added to the queue. After step 410, method 400 moves to step 420.

At step 420, method 400 determines an LSP acknowledgment rate that indicates a rate at which a plurality of LSP acknowledgments are received at the network node from the receiving node. In some embodiments, the LSP acknowledgements are LSP acknowledgements 160. In some embodiments, the plurality of LSP acknowledgments are Partial Sequence Number Protocol Data Units (PSNPs). In some embodiments, step 420 includes analyzing a retransmit queue of LSPs on the network node to determine how fast LSPs are being removed from the queue. After step 420, method 400 moves to step 430.

At step 430, method 400 determines a new transmit rate based on the current transmit rate of step 410 and the LSP acknowledgment rate of step 420. In some embodiments, the new transmit rate is new transmit rate 220. In some embodiments, the new transmit rate is lower than the current transmit rate when the LSP acknowledgment rate of step 420 is less than the current transmit rate. In some embodiments, the new transmit rate is higher than the current transmit rate when the LSP acknowledgment rate of step 420 is equal to or greater than the current transmit rate. After step 430, method 400 moves to step 440.

At step 440, method 400 transmits a plurality of LSPs from the network node to the receiving node using the new transmit rate of step 430. In some embodiments, step 440 occurs during a Link State Update operation. After step 420, method 400 ends.

Although this disclosure describes and illustrates particular steps of method 400 of FIG. 4 as occurring in a particular order, this disclosure contemplates any suitable steps of method 400 of FIG. 4 occurring in any suitable order. Although this disclosure describes and illustrates an example method 400 for link state flooding transmitter-based flow control, this disclosure contemplates any suitable method 400 for link state flooding transmitter-based flow control, including any suitable steps, which may include all, some, or none of the steps of the method of FIG. 4, where appropriate. Although this disclosure describes and illustrates particular components, devices, or systems carrying out particular steps of method 400 of FIG. 4, this disclosure contemplates any suitable combination of any suitable components, devices, or systems carrying out any suitable steps of method 400 of FIG. 4. For example, a network controller may perform one or more of the steps of method 400.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. A network node, comprising:

one or more processors; and one or more computer-readable non-transitory storage media coupled to the one or more processors and comprising instructions that, when executed by the one or more processors, cause the network node to perform operations comprising:

determining a current transmit rate that protocol data units (PDUs) are being transmitted from the network node to a receiving node by analyzing a retransmit queue to determine how fast the PDUs are being added to the retransmit queue;

determining an acknowledgment rate that acknowledgments are being received at the network node from the receiving node; and determining a new transmit rate based on the current transmit rate and the acknowledgment rate.

2. The network node of claim 1, the operations further comprising maintaining the retransmit queue, wherein:

a PDU is added to the retransmit queue when the PDU is sent to the receiving node; and the PDU is deleted from the retransmit queue once a corresponding acknowledgment is received from the receiving node.

3. The network node of claim 1, wherein determining the acknowledgment rate that the acknowledgments are being received at the network node from the receiving node comprises analyzing the retransmit queue of PDUs on the network node to determine how fast the PDUs are being removed from the retransmit queue.

4. The network node of claim 1, wherein the acknowledgments represent Partial Sequence Number Protocol Data Units (PSNPs).

5. The network node of claim 1, wherein the operations are performed using an Intermediate System to Intermediate System (IS-IS) protocol, an Open Shortest Path First (OSPF) protocol, or a combination thereof.

6. The network node of claim 1, wherein:

the new transmit rate is lower than the current transmit rate when the acknowledgment rate is less than the current transmit rate; and the new transmit rate is higher than the current transmit rate when the acknowledgment rate is greater than the current transmit rate.

7. A method, comprising:

determining a current transmit rate that protocol data units (PDUs) are being transmitted from a network node to a receiving node by analyzing a retransmit queue to determine how fast the PDUs are being added to the retransmit queue;

determining an acknowledgment rate that acknowledgments are being received at the network node from the receiving node; and determining a new transmit rate based on the current transmit rate and the acknowledgment rate.

8. The method of claim 7, further comprising maintaining the retransmit queue, wherein:

a PDU is added to the retransmit queue when the PDU is sent to the receiving node; and the PDU is deleted from the retransmit queue once a corresponding acknowledgment is received from the receiving node.

9. The method of claim 7, wherein determining the acknowledgment rate that the acknowledgments are being received at the network node from the receiving node comprises analyzing the retransmit queue of PDUs on the network node to determine how fast the PDUs are being removed from the retransmit queue.

10. The method of claim 7, wherein the acknowledgments represent Partial Sequence Number Protocol Data Units (PSNPs).

11. The method of claim 7, wherein:

the new transmit rate is lower than the current transmit rate when the acknowledgment rate is less than the current transmit rate; and the new transmit rate is higher than the current transmit rate when the acknowledgment rate is greater than the current transmit rate.

12. One or more computer-readable non-transitory storage media embodying instructions that, when executed by a processor, cause the processor to perform operations, the operations comprising:

determining a current transmit rate that protocol data units (PDUs) are being transmitted from a network node to a receiving node by analyzing a retransmit queue to determine how fast the PDUs are being added to the retransmit queue;

determining an acknowledgment rate that acknowledgments are being received at the network node from the receiving node; and determining a new transmit rate based on the current transmit rate and the acknowledgment rate.

13. The one or more computer-readable non-transitory storage media of claim 12, the operations further comprising maintaining the retransmit queue, wherein:

a PDU is added to the retransmit queue when the PDU is sent to the receiving node; and the PDU is deleted from the retransmit queue once a corresponding acknowledgment is received from the receiving node.

14. The one or more computer-readable non-transitory storage media of claim 13, wherein the acknowledgments represent Partial Sequence Number Protocol Data Units (PSNPs).

15. The one or more computer-readable non-transitory storage media of claim 13, wherein the operations are performed using an Intermediate System to Intermediate System (IS-IS) protocol, an Open Shortest Path First (OSPF) protocol, or a combination thereof.

16. The one or more computer-readable non-transitory storage media of claim 13, wherein:

the new transmit rate is lower than the current transmit rate when the acknowledgment rate is less than the current transmit rate; and the new transmit rate is higher than the current transmit rate when the acknowledgment rate is greater than the current transmit rate.

17. The one or more computer-readable non-transitory storage media of claim 13, wherein determining the acknowledgment rate that the acknowledgments are being received at the network node from the receiving node comprises analyzing the retransmit queue of PDUs on the network node to determine how fast the PDUs are being removed from the retransmit queue.

* * * * *